(No Model.)

C. S. KELLOGG.
DEVICE FOR KEEPING STALLS CLEAN.

No. 474,559. Patented May 10, 1892.

Witnesses
J. M. Fowler Jr.
Thomas Durant

Inventor
Charles S. Kellogg,
by Church & Church
his Attorneys

UNITED STATES PATENT OFFICE.

CHARLES S. KELLOGG, OF CHESTERTON, INDIANA.

DEVICE FOR KEEPING STALLS CLEAN.

SPECIFICATION forming part of Letters Patent No. 474,559, dated May 10, 1892.

Application filed January 7, 1892. Serial No. 417,284. (No model.)

*To all whom it may concern:*

Be it known that I, CHARLES S. KELLOGG, of Chesterton, in the county of Porter and State of Indiana, have invented certain new and useful Improvements in Devices for Keeping Stalls Clean; and I do hereby declare the following to be a full, clear, and exact description of the same, reference being had to the accompanying drawings, forming a part of this specification, and to the letters of reference marked thereon.

This invention has for its object to provide a device for catching the evacuations of domestic animals, particularly horses, and conveying the same out of the stall, which device shall consist of a few parts, be cleanly, and of practically no inconvenience to the animal.

The invention consists in certain novel details of construction and combinations and arrangements of parts, all as will be now described, and pointed out particularly in the appended claims.

Figure 1:
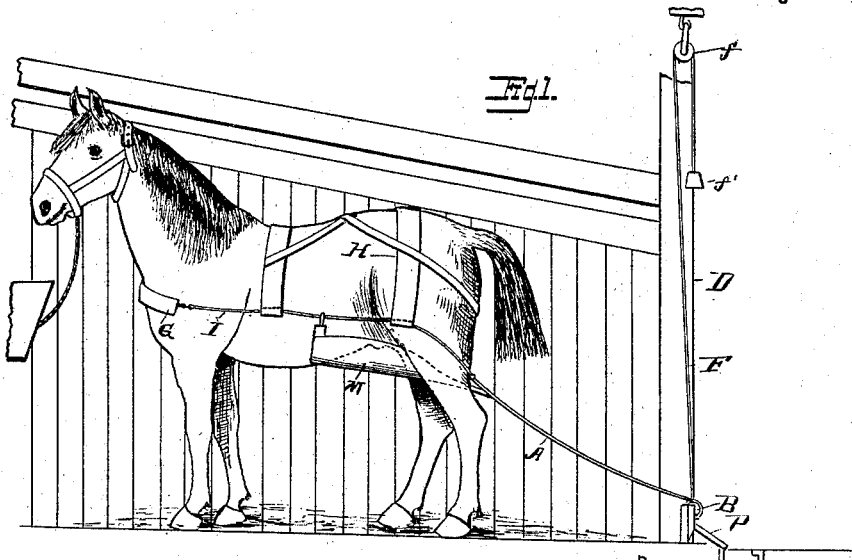
Figure 2:
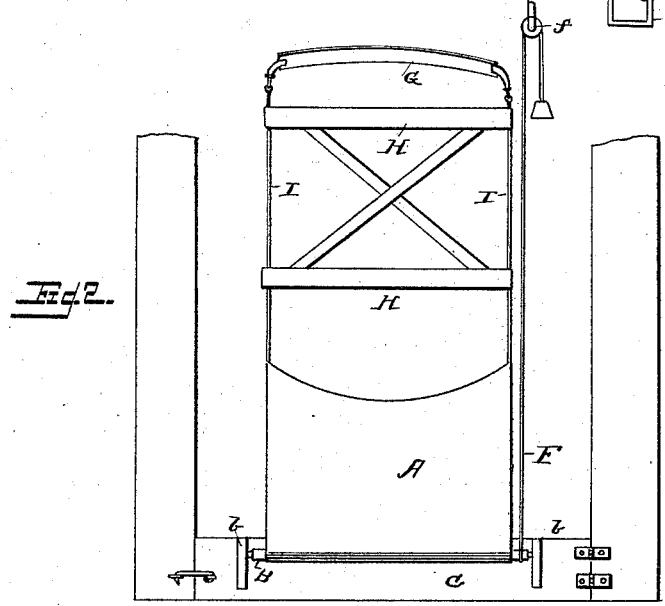
Figure 3:
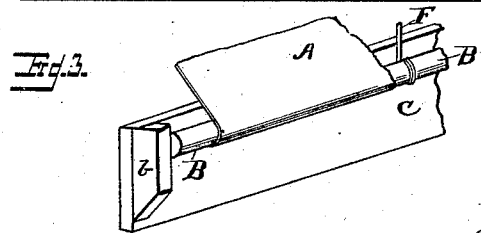

Referring to the accompanying drawings, Figure 1 is a side elevation of a device constructed in accordance with my present invention, showing the manner of securing it to the horse or other animal. Fig. 2 is a rear view of a stall, showing the harness portion of the device spread open. Fig. 3 is a detail of the chute-roller.

Like letters of reference in the several figures indicate the same parts.

In carrying this invention into practice I make use of a flexible chute, preferably in the form of a fabric apron, supported outside of the stall approximately at the floor-level in such manner as to take up slack and pay out when pulled, while the forward end is secured in position to follow the movements of the animal and to receive the evacuations. The letter A indicates this flexible chute, which may consist of canvas, rubber-cloth, or other suitable material of sufficient strength. At the lower end the chute shown is rolled on a roller B, mounted in bearings *b* on a gate C, preferably hinged to one side of the stall or one of the stall-posts D. This roller is adapted to automatically wind up the chute, either by means of the ordinary internal spring—such as used in window-shade fixtures—or by means of a rope F, wound reversely on one end of the roller and passing over a pulley *f* above, with a depending weight *f'* attached to the free end.

The free end of the chute may be cut out or otherwise formed to fit closely around the haunches of the animal, where it is held by a harness consisting of a breast-strap G, back-straps H, and side straps I. The back and side straps are preferably permanently connected as in ordinary harness, and the breast-strap detachably connected to the forward end of the side straps for convenience in application and removal. The straps may be made adjustable, as usual, and, when desired, a belly-band may be employed to hold the harness down, although this is usually accomplished by the tension on the chute, which is secured to the side straps by each corner, as shown.

A simple apparatus as above is all that is necessary for female animals; but when it is desired to catch and carry off the urine of male animals an additional attachment is necessary. This attachment I preferably make in the form of a shallow pouch M, held by straps at the forward end detachably secured to the side straps by snap-hooks and by similar straps at the rear end passing around the haunches and secured to the harness at any suitable point. The front end of the pouch hangs beneath the abdomen of the animal and the rear end passes between the hind legs. The rear end is extended, preferably in tubular form, down the chute to a point sufficiently low to secure perfect clearance or drainage when it passes through the chute and opens on the upper side, from whence the urine may run off down the chute.

A trough O is preferably formed in the floor behind all the stalls to receive the evacuations, being provided with covers P, which are closed when the gate C is opened and the horse taken out.

The device as a whole, it will be seen, is simple and efficient, and the harness, besides serving to keep the chute and pouch in place, also serves as an excellent means for securing the blankets, &c.

Having thus described my invention, what I claim as new is—

1. In a device for catching the evacuations of domestic animals, the combination, with the flexible and extensible chute having its rear end carried by a support near the floor at rear of the stall, of the harness for application to the animal to hold the front end of the chute in place, substantially as described.

2. In a device for catching the evacuations of domestic animals, the combination, with the flexible chute and harness by which it is attached to the animal, of the roller to which the rear end of the chute is attached, journaled low down in rear of the stall, and means for turning said roller and taking up slack in the chute, substantially as described.

3. In a device for catching the evacuations of domestic animals, the combination, with the flexible chute and harness by which it is attached to the animal, of the roller on which the chute is wound, journaled low down in rear of the stall, the rope reversely wound on the roller, the pulley over which the rope passes, and the weight on the rope for turning the roller and taking up slack in the chute, substantially as described.

4. In a device of the character indicated, the combination, with the chute, of the movable gate at the rear of the stall upon which the rear end of the chute is carried, substantially as described.

5. In a device of the character indicated, the combination, with the flexible chute and harness, of the movable gate at the rear of the stall and the roller on said gate upon which the chute is wound, with means for turning the roller to take up slack in the chute, substantially as described.

6. In a device of the character indicated, the combination, with the flexible chute and the roller to which it is attached, of the urine-pouch having the tubular extension opening into the chute and the harness for supporting the pouch beneath the abdomen of the animal, substantially as described.

CHARLES S. KELLOGG.

Witnesses:
 HIRAM GREEN,
 CHAS. L. JEFFREY.